US008255928B2

(12) United States Patent
Kusko et al.

(10) Patent No.: US 8,255,928 B2
(45) Date of Patent: Aug. 28, 2012

(54) AUTOMATED TERMINATION OF SELECTED SOFTWARE APPLICATIONS IN RESPONSE SYSTEM EVENTS

(75) Inventors: Mary P. Kusko, Hopewell Junction, NY (US); Frank Eliot Levine, Austin, TX (US); Stella Lee Taylor, Las Vegas, NV (US); Anna W. Topol, Jefferson Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 12/389,163

(22) Filed: Feb. 19, 2009

(65) Prior Publication Data

US 2010/0211950 A1    Aug. 19, 2010

(51) Int. Cl.
    G06F 13/00    (2006.01)
(52) U.S. Cl. ........................................ 719/318; 718/100
(58) Field of Classification Search .................. 719/318; 718/100
    See application file for complete search history.

(56) References Cited

U.S. PATENT DOCUMENTS

| 5,303,171 | A |   | 4/1994  | Belt et al. |
| 5,526,485 | A | * | 6/1996  | Brodsky ..................... 714/38.13 |
| 5,850,559 | A |   | 12/1998 | Angelo et al. |
| 6,065,121 | A |   | 5/2000  | Hobson et al. |
| 6,401,138 | B1 | * | 6/2002 | Judge et al. .................... 719/328 |
| 6,425,039 | B2 | * | 7/2002 | Yoshioka et al. .............. 710/269 |
| 6,883,176 | B1 | * | 4/2005 | Grooters .......................... 725/39 |
| 7,171,663 | B2 | * | 1/2007 | Moore et al. ...................... 718/1 |
| 7,958,442 | B2 | * | 6/2011 | Olsen et al. .................... 715/205 |
| 2003/0051068 | A1 | * | 3/2003 | Eldridge et al. .............. 709/318 |
| 2007/0128899 | A1 |   | 6/2007 | Mayer |
| 2007/0294550 | A1 |   | 12/2007 | May et al. |

FOREIGN PATENT DOCUMENTS

JP    2007072679    3/2007

* cited by examiner

*Primary Examiner* — Andy Ho
(74) *Attorney, Agent, or Firm* — Yee & Associates, P.C.; David A. Mims, Jr.

(57) ABSTRACT

A process registers a system management event in an application configuration database. Responsive to detecting the registered system management event during execution of one application of the set of applications, the process identifies applications of the set of applications associated with the registered system management event that are executing. The process then terminates the applications of the set of applications associated with the registered system management event that are executing. Responsive to terminating the applications of the set of applications associated with the registered system managing event that are executing, the process then executes a handler that processes the registered system management event.

20 Claims, 4 Drawing Sheets

APPLICATION CONFIGURATION DATABASE 400

| REGISTERED SYSTEM MANAGEMENT EVENT COLUMN 406 | APPLICATIONS COLUMN 408 | ACTION COLUMN 410 | RESTART EVENT COLUMN 412 |
|---|---|---|---|
| HIBERNATE | VIRUS SCAN | TERMINATE/ RESUME ON RESTART | POWER ON |
| UNDOCK | MEDIA PLAYER | TERMINATE | |

402 → (row 1), 404 → (row 2)

AUTOMATED TERMINATION OF SELECTED
SOFTWARE APPLICATIONS IN RESPONSE
SYSTEM EVENTS

BACKGROUND OF THE INVENTION

1. Field of the Invention

The disclosure relates generally to a data processing system, and in particular, to a method and apparatus for managing software applications. More specifically, the disclosure is directed to a computer implemented method, apparatus, and computer program product for managing the execution of a set of applications in response to detecting a system management event.

2. Description of the Related Art

Data processing systems are machines that manipulate data according to a list of instructions. A generic data processing system includes four main components: an arithmetic and logic unit (ALU), a control unit, memory, and input/output devices (I/O). The components of a data processing system may be interconnected by busses.

The data processing system may host an operating system and one or more applications. The software hosted on the data processing system may be executed using resources of the data processing system. During the execution of the software on the data processing system, events may arise that affect the execution of the software on the data processing system.

BRIEF SUMMARY OF THE INVENTION

According to one embodiment of the present invention, the process registers a system management event in an application configuration database. Responsive to detecting the registered system management event during execution of one application of a set of applications, the process identifies applications of the set of applications associated with the registered system management event that are executing. The process then terminates the applications of the set of applications associated with the registered system management event that are executing. Responsive to terminating the applications of the set of applications associated with the registered system management event that are executing, the process then executes a handler that processes the registered system management event.

DETAILED DESCRIPTION OF THE INVENTION

Figure 1:
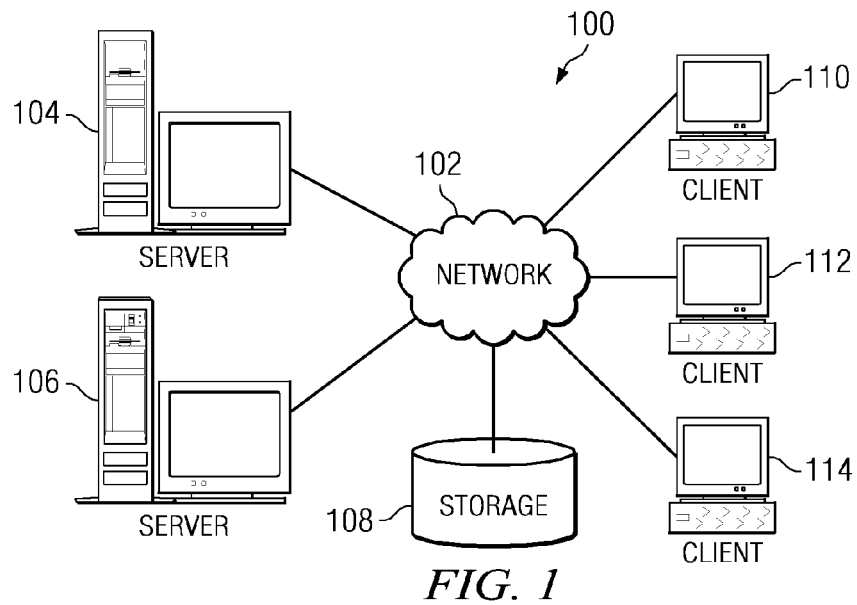
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. In an illustrative example, a client, such as client 110, may host a set of executing applications. The set of applications may be associated with one or more registered system management events. In response to detecting a registered system management event, an application control module terminates applications of the set of applications associated with the registered system management event that are executing. Responsive to terminating the applications of the set of applications associated with the registered system managing event that are executing, the application control module then executes a handler that processes the registered system management event.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
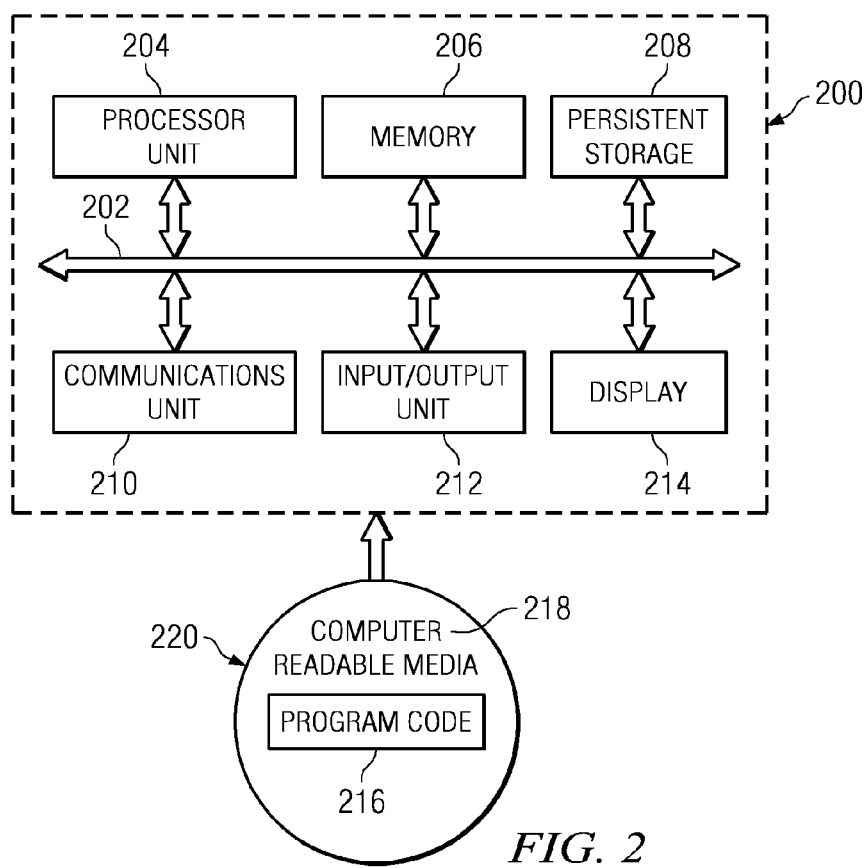
FIG. 2 is a block diagram of a data processing system in which illustrative embodiments may be implemented.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of processors. As used herein, the term "set" may refer to one or more. Thus, a set of processors may be one or more processors. In addition, processor unit 204 may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer-recordable storage media. In some instances, computer-recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Management of applications executing on a data processing system may conserve resources of the data processing system. Consequently, additional resources may be applied for more crucial processes. In addition, management of system resources may cause an executing application to terminate before the application has time to complete. Terminating the application without having to notify the application may obviate the need to significantly modify the application; instead, control mechanisms may be introduced to an operating system for system-wide implementation. An example of a system power management event is a change in the system power status or the value of a power setting. Because these events can affect the operation of applications and installable drivers, usually the system notifies all applications and installable drivers by broadcasting a notification for each event for each driver or application that has registered for the events. Those applications that need to avoid losing or corrupting data should still be notified, but those that do not need to be notified to avoid corrupting data can be terminated without any changes to the application.

In some cases, the application may be started and terminated in response to a system management event. The application may also be informed of the system management event to perform some type of action, such as, setting an indicator that the event occurred. In response to another system management event, the application may be started and notified that it had previously been terminated. During the application's initialization process, in response to detecting a previous system management event, the application may use this information to change its default initialization behavior. For example, an application that automatically requests information from a server during its start up, may postpone the request for information if it knows that the system has changed its state. This is important in cases where connectivity is not available. By avoiding the request for information until connectivity is restored or the user initiates the request for access, improved user satisfaction for the application may occur.

In one embodiment, the process registers a system management event to form a registered system management event. In response to detecting the registered system management event during execution of one of a set of applications, the process identifies applications of the set of applications associated with the registered system management event that are executing. The process then terminates the applications of the set of applications associated with the registered system management event that are executing. Responsive to terminating the applications of the set of applications associated with the registered system managing event that are executing, the process then executes a handler that processes the registered system management event.

Figure 3:
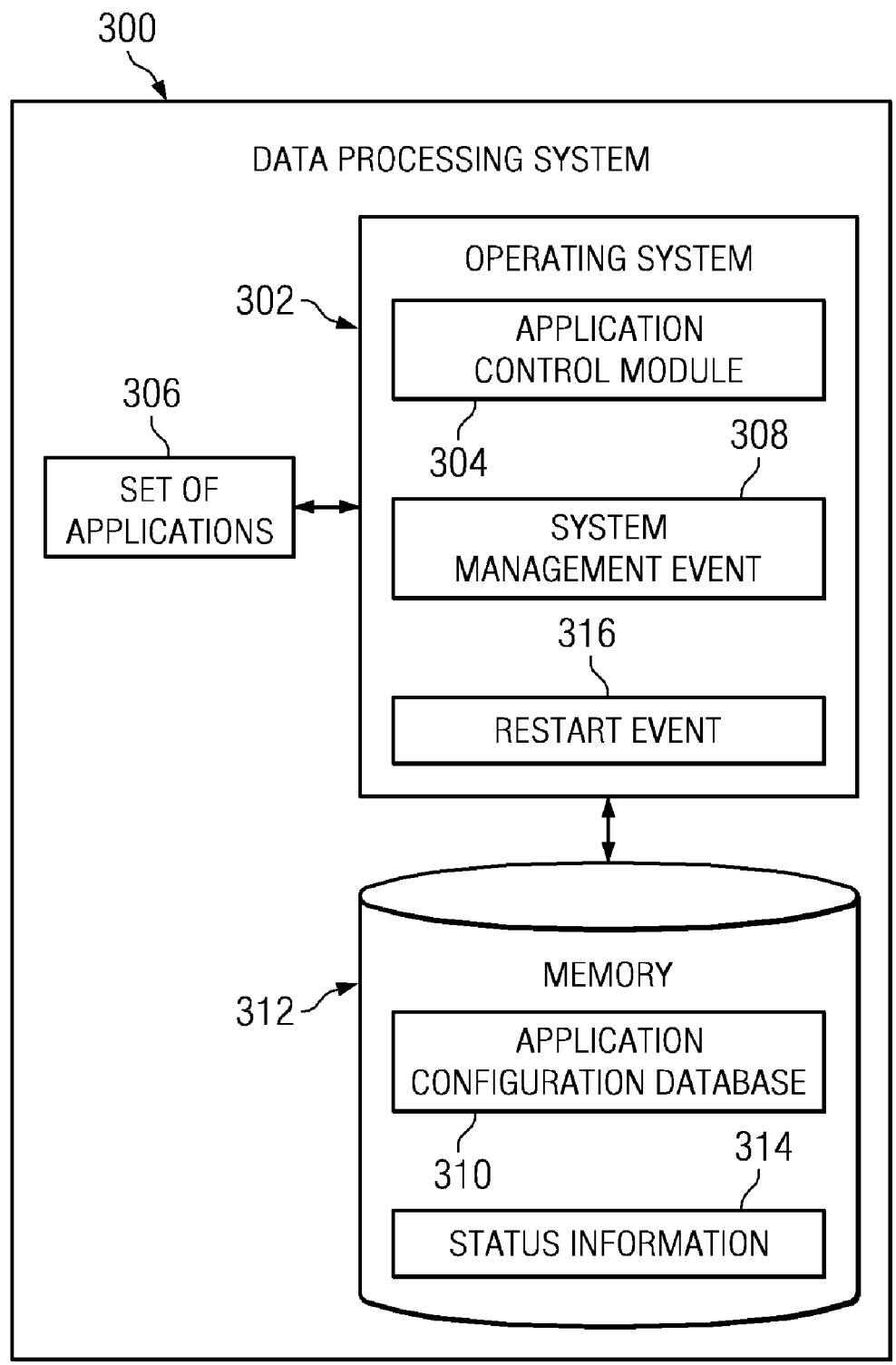
FIG. 3 is a block diagram of a data processing system for managing software applications in accordance with an illustrative embodiment.

FIG. 3 is a block diagram of a data processing system for managing software applications in accordance with an illustrative embodiment. Data processing system 300 is a data processing system such as client 110 in FIG. 1.

Data processing system 300 includes operating system 302. Operating system 302 is software for managing and coordinating activities and the sharing of resources of data processing system 300. Examples of operating system 302 include, without limitation, Microsoft Windows®, Mac OS X®, Linux®, or any other currently existing or later developed operating system. Windows is a registered trademark of Microsoft Corporation. Mac OS X is a registered trademark of Apple, Inc. Linux is a registered trademark of Linus Torvalds.

Operating system 302 includes application control module 304. Application control module 304 is a software component of operating system 302 configured for managing set of applications 306. Set of applications 306 is one or more software applications executing data processing system 300. Set of applications 306 may include, for example, a word processing program, an email program, an instant messenger application, a virus scan application, or any other software application that may execute on data processing system 300.

Application control module 304 manages the execution of set of applications 306 by performing a specified action in response to detecting system management event 308. System management event 308 is a detectable event that occurs during the operation of data processing system. The event may be a change in the system status, the operational mode of a device or the system, or the value of particular setting. Examples of system management event 308 may include, without limitation, undocking data processing system 300, shutting down data processing system 300, suspending data processing system 300, changing the power management support to increase or to decrease the power, detecting an overheating situation, or a battery low on power situation, or a hibernation event, while power is connected, or detecting a predefined system notification, or other type of system event.

Application control module 304 manages the execution of set of applications 306 with reference to application configuration database 310. Application configuration database is an application for managing the storage and access of data. System management events, such as system management event 308, are registered in application configuration database 310 to form registered system management events. Registered system management events are associated with one or more registered applications from set of applications 306. In addition, application configuration database 310 associates each registered application with an action. Thus, in this illustrative embodiment in FIG. 3, application configuration database 310 includes entries associating a registered system management event with registered applications from set of applications 306 and also with associated actions. The actions may be, for example, termination and/or restart of the identified applications and execution of the identified applications. Thus, in response to detecting system management event 308, application control module 304 may identify which applications from set of applications 306, if any, are associated with system management event 308. In addition, application control module 304 may take the action specified. An example of an application configuration database is provided in FIG. 4.

Application configuration database 310 is stored in memory 312. Memory 312 is memory such as memory 206 in FIG. 2. Memory 312 also includes status information 314. Status information 314 is data generated from an execution of applications from set of applications 306. In particular, status information 314 includes data describing the state of applications before termination of execution of the applications so that the applications may be resumed at the point immediately prior to termination. Status information 314 may include, for example, a name of an application, the date and time in which the application was terminated, processes of the application which were interrupted, or any other relevant information that may be used to resume the execution of the terminated application. Thus, application control module 304 references status information 314 for resuming an execution of applications from set of applications 306.

Application control module 304 resumes the execution of applications from set of applications 306 which were terminated in response to detecting system management event 308. Restart event 316 is a detectable event that triggers application control module 304 to resume the execution of any applications terminated in response to detecting system management event 308. Restart events are often correlated with a particular system management event. For example, if system management event 308 is a request for data processing system 300 to hibernate, then restart event 316 may be a subsequent request to power on. Also, if system management event 308 is an undocking event, then restart event 316 may be a docking event.

In one illustrative example, a user registers system management event 308 in application configuration database 310 to form a registered system management event. In this example, system management event 308 is the unplugging of a laptop from an electrical outlet which causes the laptop to run on battery power. The user then registers applications from set of applications 306 in application configuration database. In this example, the user may register a virus scanning application from set of applications 306. The registration of the virus scan application associates system management event 308 with the virus scan application. In addition, the user selects related actions for implementation in response to detecting system management event 308. In this example, the user may select an action that indicates "terminate/resume on restart".

Thus, in response to detecting system management event 308 by the unplugging of data processing system 300, application control module 304 references application configuration database 310 to determine whether system management event 308 is a registered system management event. Once located in application configuration database 310, application control module 304 identifies each application from set of applications 306 that is associated with the registered system management event. In this example, only the virus scan application is associated with system management event 308 registered in application configuration database 310.

Application control module 304 then determines which action to take. The action is specified by the relevant entry in application configuration database 310. The action indicates that the virus scan is to be terminated in response to detecting system management event 308. Application control module 304 then terminates the execution of the virus scan application. Further, because the entry in application configuration database 310 provides for restart, application control module 304 may restart the virus scan application in response to detecting restart event 316. In this example, restart event 316 is the plugging in of data processing system 300 into an outlet. The virus scan is restarted with reference to status information 314. Status information 314 is saved prior to terminating the execution of the virus scan application. Status information 314 enables application control module 304 to complete the previously executing virus scan from the time immediately prior to termination.

In another illustrative example, an application may be terminated as part of a power saving sequence such as a hibernating event. This capability may be important in applications that use the internet or specialized internet access. The termination sequence will allow for all queued notes to be sent and the application to terminate so that it will not attempt to access the network on resume.

In a further illustrative example, an application of the set of applications may be registered for execution only when a handler for processing the registered system management event is executing. In particular, the application may be an application which begins executing in response to a start of processing of the registered system management event, and stops executing prior to an end of the processing of the registered system management event. For such an application, any attempt to execute the application at any other time is rejected.

In an illustrative example, if the registered system management event is shutting down of a data processing system, an application that is registered for execution only when a handler for processing the registered system management event is executing, may be an application for logging data collection, including notification of the shutdown. In such an example, before the power is actually turned off, the application is terminated.

Figures 4, 6:
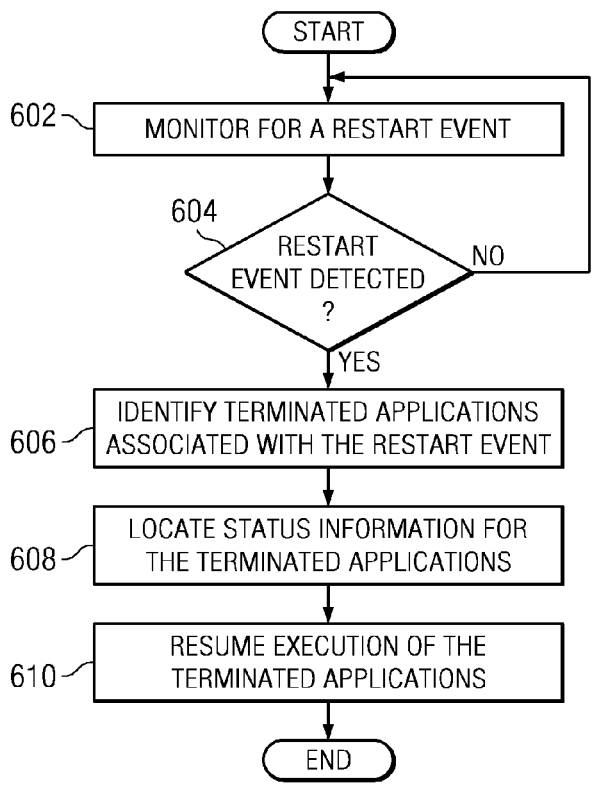
FIG. 4 is a block diagram of an application configuration database in accordance with an illustrative embodiment.
FIG. 6 is a flowchart of a process for resuming an execution of a terminated application in accordance with an illustrative embodiment.

FIG. 4 is block diagram of an application configuration database in accordance with an illustrative embodiment. Application configuration database 400 is an application configuration database such as application configuration database 310 in FIG. 3.

Application configuration database 400 depicted in FIG. 4 includes entries 402 and 404. Entries 402 and 404 are records of application configuration database 400 for registered system management events. Application configuration database 400 includes registered system management event column 406, applications column 408, action column 410, and restart event column 412.

Registered system management events are stored in fields in registered system management event column 406. In this example in FIG. 4, the registered system management events of registered system management event column 406 includes "hibernate" and "undock".

Applications column 408 is a column of application configuration database 400 for storing an identifier specifying the applications associated with a registered system management event in registered system management event column 406. Thus, in entry 402, the hibernate system management event is a registered system management event associated with a virus scan application. Similarly, in entry 404, the undock system management event is a registered system management event associated with a media player application.

Application configuration database 400 also includes action column 410. Action column 410 is a column specifying the actions to be performed by an application control module on applications identified in applications column 410 in response to detecting a system management event registered in application configuration database 400. In this example in FIG. 4, both the applications specified in applications column 408 are terminated by an application control module in response to detecting the corresponding system management event.

Restart event column 412 is a column storing an identifier specifying a restart event, if any, which may cause a terminated application to resume execution. Thus, in entry 402, the terminated virus scan may be resumed if an application control module detects a power on event. A power on event is an event that causes a hibernating data processing system to resume processing activities.

In an illustrative embodiment, an application control module, such as application control module 304 in FIG. 3 detects a system management event. The system management event is a system management event such as system management event 308 in FIG. 3. The application control module then determines whether the system management is a registered system management event by searching application configuration database 400 for an entry corresponding to the system management event.

If the application control module locates an entry in application configuration database 400 for the system management event, then the application control module identifies the set of applications associated with the registered system management event. The application control module then initiates or performs the actions specified in the registered system management event entry. For example, a system management event may be a request to hibernate a data processing system hosting an operating system having an application control module. The application control module may detect the request to hibernate the data processing system. The application control module may determine that the system management event is a registered system management event by locating entry 402 in application configuration database 400. Entry 402 corresponds to the request to hibernate.

The application control module then identifies a set of applications associated with the registered system management event. In this example, the set of applications is a virus scan. The application control module performs the action specified in the action column. In this example, the application control module terminates the virus scan if the virus scan is executing when the request to hibernate is detected.

In addition, the action column indicates that the control module may restart the virus scan if the specified restart event indicated in the restart event column is detected. Entry 402 indicates that the restart event is a power on event. Thus, if the data processing system is powered on after a period of hibernation, then the application control module will restart the virus scan. The virus scan resumes from the point of termination using status information, such as status information 314 in FIG. 3. Thus, if the virus scan was half complete before the virus scan was terminated, then the application control module resumes execution of the virus scan to complete the second half of the virus scan.

Figure 5:
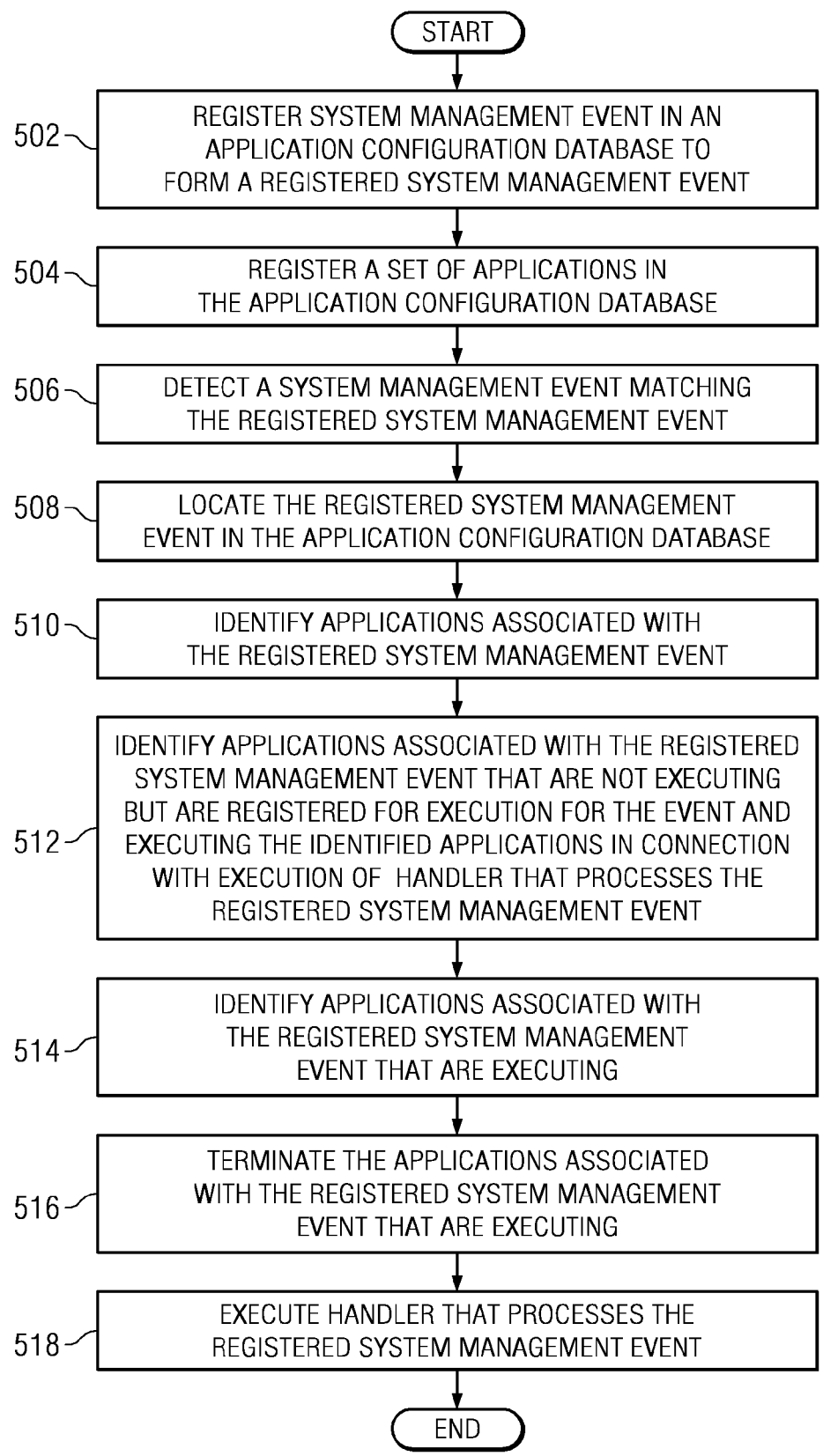
FIG. 5 is flowchart of a process for managing software applications in accordance with an illustrative embodiment.

FIG. 5 is flowchart of a process for managing applications in a data processing system in accordance with an illustrative embodiment. The process may be implemented by a software component such as application control module 304 in FIG. 3.

The process begins by registering a system management event in an application configuration database to form a registered system management event (step 502). The process then registers a set of applications in the application configuration database (step 504). Registration of the system management event and the set of applications forms an application configuration database associating a system management event with one or more applications and an action. The action may be an instruction to terminate the one or more applications. In addition, the action may be an instruction to resume the one or more applications in response to detecting a restart event. An example of an application configuration database is application configuration database 400 in FIG. 4.

The process then detects a system management event matching the registered system management event in the application configuration management database (step 506). The system management event is a system management event such a system management event 308 in FIG. 3. In response to detecting the system management event, the process locates the registered system management event in the application configuration database (step 508). The process then identifies applications associated with the registered system management event (step 510).

The process then identifies applications of the set of applications associated with the registered system management event that are not executing but are registered for execution for the event, and executes the identified applications in connection with an execution of a handler that processes the registered system management event (step 512).

The process also identifies applications of the set of applications associated with the registered system management event that are executing (step 514). The process then terminates the applications associated with the registered system management event that are executing (step 516). Responsive to terminating the applications of the set of applications associated with the registered system managing event that are executing, the process then executes a handler that processes the registered system management event (step 518) and terminates thereafter.

FIG. 6 is a flowchart of a process for resuming an execution of a terminated application in accordance with an illustrative embodiment. The process in FIG. 6 may be implemented by a software component such as application control module 304 in FIG. 3.

The process begins by monitoring for a restart event (step 602). The restart event is a restart event such as restart event 316 in FIG. 3. The process then makes the determination as to whether a restart event has been detected (step 604).

If a restart event has not been detected, then the process returns to step 602. However, if the process makes the determination that a restart event has been detected; the process identifies terminated applications associated with the restart event (step 606). The process then locates status information for the terminated applications (step 608) and resumes execution of the terminated applications using the status information (step 610). The process terminates thereafter.

The illustrative embodiments disclosed herein describe a method and apparatus for managing a set of applications executing on a data processing system. The process provides a user greater control in the management of a set of applications executing on a data processing system. For example, executing applications may be terminated without the need for informing the application. In addition, maintenance of status information by the application control module enables the terminated applications to resumed in a seamless fashion.

The process for controlling the management of the set of applications begins by registering a system management event to form a registered system management event. Thereafter, in response to detecting the registered system management event during execution of one of the set of applications, the process identifies applications of the set of applications associated with the registered system management event that are executing. The process then terminates the applications of the set of applications associated with the registered system management event that are executing. Responsive to terminating the applications of the set of applications associated with the registered system managing event that are executing, the process then executes a handler that processes the registered system management event.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing a set of applications, the method comprising:
 a computer registering a system management event in an application configuration database;
 responsive to the computer detecting the registered system management event during execution of one application of the set of applications, the computer identifying applications of the set of applications associated with the registered system management event that are executing;

the computer terminating the applications of the set of applications associated with the registered system management event that are executing;

responsive to the computer terminating the applications of the set of applications associated with the registered system management event that are executing, the computer executing a handler that processes the registered system management event; and responsive to the computer detecting another system management event that indicates the applications are being restarted, the computer performing a modified initialization of the applications by postponing one or more requests for information from the applications during a computer startup process for the computer.

2. The method of claim 1 wherein the computer registering the system management event includes registering the set of applications in the application configuration database during installation of each application of the set of applications, wherein the set of applications are associated with the registered system management event, and further comprising:

responsive to the computer detecting the registered system management event, the computer locating the registered system management event in the application configuration database.

3. The method of claim 1, wherein the terminating step further comprises:

the computer saving status information for the terminated applications before the terminating.

4. The method of claim 3, further comprising:

responsive to the computer detecting a restart event, the computer restarting the terminated applications using the saved status information for the terminated applications.

5. The method of claim 1, further comprising:

the computer identifying an application of the set of applications associated with the registered system management event that is not executing and is registered for execution for the event; and the computer executing the identified application during execution of the handler that processes the registered system management event.

6. The method of claim 5, wherein the computer executing the identified application during execution of the handler that processes the registered system management event comprises:

the computer starting execution of the identified application after a start of execution of the handler that processes the registered system management event; and the computer ending execution of the identified application prior to an end of the execution of the handler that processes the registered system management event, wherein the identified application is executed only during execution of the handler that processes the registered system management event.

7. The method of claim 1 wherein the one or more requests for information that are postponed at least include a request that requires connectivity, and further comprising:

the computer performing the request that requires connectivity when connectivity is restored or when a user initiates a request for access.

8. A computer program product comprising:

a computer readable storage medium having computer usable program instructions for managing a set of applications, the computer program product comprising;

program instructions for registering a system management event;

program instructions, responsive to detecting the registered system management event during execution of one application of the set of applications, for identifying applications of the set of applications associated with the registered system management event that are executing;

program instructions for terminating the applications of the set of applications associated with the registered system management event that are executing;

program instructions, responsive to terminating the applications of the set of applications associated with the registered system management event that are executing, for executing a handler that processes the registered system management event; and program instructions, responsive to detecting another system management event that indicates the applications are being restarted, for performing a modified initialization of the applications by postponing one or more requests for information from the applications during a computer startup process for a computer.

9. The computer program product of claim 8, further comprising:

program instructions for registering the set of applications in an application configuration database during installation of each application of the set of applications, wherein the set of applications are associated with the registered system management event; and responsive to detecting the registered system management event, program instructions for locating the registered system management event in the application configuration database.

10. The computer program product of claim 8, wherein the program instructions for terminating the applications of the set of applications associated with the registered system management event that are executing further comprises:

program instructions for saving status information for the terminated applications before the terminating.

11. The computer program product of claim 10, further comprising:

program instructions, responsive to detecting a restart event, for restarting the terminated applications using the saved status information for the terminated applications.

12. The computer program product of claim 8, further comprising:

program instructions for identifying an application of the set of applications associated with the registered system management event that is not executing and is registered for execution for the event; and program instructions for executing the identified application during execution of the handler that processes the registered system management event.

13. The computer program product of claim 12, wherein the program instructions for executing the identified application during execution of the handler that processes the registered system management event, comprises:

instructions for starting execution of the identified application after a start of execution of the handler that processes the registered system management event; and instructions for ending execution of the identified application prior to an end of the execution of the handler that processes the registered system management event, wherein the identified application is executed only during execution of the handler that processes the registered system management event.

14. The computer program product of claim 8 wherein the one or more requests for information that are postponed at least include a request that requires connectivity, and further comprising:

programinstructions for performing the request that requires connectivity when connectivity is restored or when a user initiates a request for access.

15. An apparatus for managing a set of applications, the apparatus comprising:

a bus system;

a memory connected to the bus system, wherein the memory includes computer usable program code; and a processing unit connected to the bus system, wherein the processing unit executes the computer usable program code to register a system management event; identify applications of the set of applications as associated with the registered system management event that are executing in response to detecting the registered system management event during execution of one application of the set of applications; terminate the applications of the set of applications associated with the registered system management event that are executing; execute a handler that processes the registered system management event in response to terminating the applications of the set of applications associated with the registered system management event that are executing; and responsive to detecting another system management event that indicates the applications are being restarted, perform a modified initialization of the applications by postponing one or more requests for information from the applications during a computer startup process for a computer.

16. The apparatus of claim 15, wherein the processing unit further executes the computer usable program code to register the set of applications in an application configuration database during installation of each application of the set of applications, wherein the application configuration database includes the registered system management event.

17. The apparatus of claim 15, wherein the processing unit further executes the computer usable program code to save status information for the terminated applications before the terminating and restart the terminated applications using the saved status information for the terminated applications.

18. The apparatus of claim 15, wherein the processing unit further executes the computer usable program code to, identify an application of the set of applications associated with the registered system management event that is not executing and is registered for execution for the event to form an identified application; and execute the identified application during execution of the handler that processes the registered system management event.

19. The apparatus of claim 18, wherein the processing unit executing the computer usable program code to execute the identified application during execution of the handler that processes the registered system management event comprises:

the processing unit executing the computer usable program code to start execution of the identified application after a start of execution of the handler that processes the registered system management event; and end execution of the identified application prior to an end of the execution of the handler that processes the registered system management event, wherein the identified application is executed only during execution of the handler that processes the registered system management event.

20. The apparatus of claim 15 wherein the one or more requests for information that are postponed at least include a request that requires connectivity, and wherein the processing unit further executes the computer usable program code to perform the request that requires connectivity when connectivity is restored or when a user initiates a request for access.

* * * * *